United States Patent
He et al.

(10) Patent No.: US 9,794,081 B2
(45) Date of Patent: Oct. 17, 2017

(54) LOGICAL MULTICASTING IN OVERLAY NETWORKS

(71) Applicant: International Business Machines Corporation, Armonk, NY (US)

(72) Inventors: Jing He, JiangSu province (CN); Jing Lu, Sichuan province (CN); Jun Yao, An Hui Province (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 288 days.

(21) Appl. No.: 14/667,861

(22) Filed: Mar. 25, 2015

(65) Prior Publication Data

US 2016/0285641 A1 Sep. 29, 2016

(51) Int. Cl.
| | |
|---|---|
| H04L 12/18 | (2006.01) |
| H04L 12/713 | (2013.01) |
| H04L 12/761 | (2013.01) |
| H04L 12/46 | (2006.01) |
| H04L 12/715 | (2013.01) |
| H04L 12/721 | (2013.01) |

(52) U.S. Cl.
CPC ........ *H04L 12/185* (2013.01); *H04L 12/4641* (2013.01); *H04L 45/16* (2013.01); *H04L 45/586* (2013.01); *H04L 45/64* (2013.01); *H04L 45/70* (2013.01)

(58) Field of Classification Search
None
See application file for complete search history.

(56) References Cited

U.S. PATENT DOCUMENTS

| | | | |
|---|---|---|---|
| 8,102,846 B2 | 1/2012 | Bijwaard | |
| 8,270,294 B2 | 9/2012 | Wu | |
| 8,320,290 B2 | 11/2012 | Chao et al. | |
| 8,582,572 B2 | 11/2013 | Gutierrez | |
| 2013/0322443 A1 | 12/2013 | Dunbar et al. | |
| 2013/0329605 A1* | 12/2013 | Nakil | H04L 41/0668 370/255 |

(Continued)

OTHER PUBLICATIONS

Sun et al; Performance Optimization of Media Distribution in Overlay Networks Using OpenFlow, 276-281, IEEE, ICOIN, 2014.

(Continued)

*Primary Examiner* — Vinncelas Louis
(74) *Attorney, Agent, or Firm* — Garg Law Firm, PLLC; Rakesh Garg; Isaac Gooshaw

(57) ABSTRACT

For logical multicasting in overlay networks, at a data processing system, an original unicast packet is received from a first component in a first computing node in an overlay network. To cause multicasting in the overlay network the received original unicast packet was unicast by the first computing node only to the data processing system, and a multicast data structure for the overlay network is maintained only by the data processing system, the multicast data structure containing information of each receiver that is configured to receive unicast packets during logical multicasting in the overlay network. From a set of subscriber receivers in the multicast data structure, a subset of the subscriber receivers is selected. A copy of the original unicast packet is unicast to each subscriber receiver in the subset.

23 Claims, 8 Drawing Sheets

(56) References Cited

U.S. PATENT DOCUMENTS

| | | |
|---|---|---|
| 2014/0079059 A1 | 3/2014 | Amir et al. |
| 2014/0098815 A1 | 4/2014 | Mishra et al. |
| 2014/0192804 A1 | 7/2014 | Ghanwani et al. |
| 2016/0094650 A1* | 3/2016 | Garcia de Rio ........ H04L 47/78 709/226 |

OTHER PUBLICATIONS

Jia; A Scalable Multicast Source Routing Architecture for Data Center Networks, IEEE Journal on Selected Areas in Communications, vol. 32, No. 1, 116-123, Jan. 2014.

* cited by examiner

LOGICAL MULTICASTING IN OVERLAY NETWORKS

TECHNICAL FIELD

The present invention relates generally to a method, system, and computer program product for communicating data in a software defined network. More particularly, the present invention relates to a method, system, and computer program product for logical multicasting in overlay networks.

BACKGROUND

A data processing environment comprises a variety of hardware, software, and firmware networking components. A physical network, also called an underlay, is a network defined using such components.

Techniques are available presently to construct a logical network, also known as a software defined network (SDN) overlay (hereinafter "overlay" or "overlay network"), from such networking components. Essentially, networking components are abstracted into corresponding logical or virtual representations, and the abstractions are used to define the overlay. In other words, an overlay is a logical network formed and operated using logical representations of underlying networking components.

Physical networks usually exist within the demarcated boundary of the data processing environment whose networking components are utilized in the physical network. Unlike a physical network, an overlay can be designed to span across one or more data processing environment. For example, while a physical network may be contained within a datacenter, an overlay may span across one or more datacenters.

As an example, a logical representation of a networking gateway can participate in an overlay, such that a function attributed to the logical representation of the networking gateway in the overlay is actually performed by the underlying networking gateway component in the underlay.

In an overlay, because the actual networking components that perform the networking functions are abstracted into logical entities representing the networking functionality offered by those components and not the actual implementations of those functionalities, something is needed to direct that networking functionality into a functioning logical network. An SDN controller is a component that manages and operates the logical networking components within an overlay.

Henceforth in this disclosure, any reference to a component within the context of an overlay is a reference to a logical or virtual representation of the component, which participates in the overlay, unless expressly distinguished where the reference is made.

A virtual machine (VM) comprises virtualized representations of real hardware, software, and firmware components available in a data processing system. The data processing system can have any number of VMs configured thereon, and utilizing any number of virtualized components therein. The data processing system is also referred to as a computing node, a compute node, a node, or a host.

In large scale data processing environments, such as in a data center, thousands of VMs can be operating on a host at any given time, and hundreds if not thousands of such hosts may be operational in the data center at the time. A virtualized data processing environment such as the described data center is often referred to as a "cloud" that provides computing resources and computing services to several clients on an as-needed basis.

Network virtualization by defining overlay networks is an emerging trend in the management and operation of data centers and cloud computing environments. One of the goals of network virtualization is to simplify the network provisioning in multi-tenant data processing environments, as well as dedicated customer data processing environments.

Unicasting is a method of sending data point-to-point, to wit, from a single sender to a single receiver. Multicasting is a method of sending data from one or more sender data processing systems to several receiver data processing systems nearly simultaneously. Internet Protocol (IP) multicast is the process of multicasting IP packets to several receivers in a single transmission of the IP packet. IP multicast is a popular technique used to help conserve bandwidth in the data center and reduce the load on servers.

Hereinafter, the terms "multicast", "multicasting", "Mcast" when used alone refer to IP multicast unless distinguished specifically where used. The terms "multicast", "multicasting", "Mcast" when used as a prefix, a suffix, or in conjunction with another term or artifact, qualifies that term or artifact as being usable in IP multicasting within the context of the usage of the term or artifact, unless distinguished specifically where used.

IP multicast operating in an overlay network is called overlay multicast. Overlay multicast can be achieved in different ways, depending on the support for multicasting provided in the underlay network. Multicast based overlay multicast requires the underlay network to provide support for multicasting. Multicasting in underlay networks is not presently prevalent in data processing environments. Multi-unicast based overlay multicast is a method to transmit multicast packets in the overlay network where the underlay supports unicasting but does not support multicasting.

The illustrative embodiments recognize that presently, the multi-unicast based overlay multicast method requires the sender computing node of the data to unicast copies of the data to each intended receiver computing nodes. The illustrative embodiments recognize that the multi-unicast based overlay multicast method of multicasting is severely limiting. For example, a virtual switch in a computing node in the overlay is responsible for replicating the data into multiple unicast packets and transmitting each unicast packet individually. The multi-unicast based overlay multicast method of multicasting consumes a significant amount of resources of the computing node at least for the purposes of replicating and unicasting the data.

Furthermore, this method of overlay multicasting requires each computing node to be aware of the node's neighborhood in the data processing environment. In other words, each computing node has to know the identities of every other active computing node in the data processing environment and maintain a current listing of every node's preference whether that node is willing to receive multicast packets.

Each VM in each computing node can decide whether the VM wants to participate in multicasting. In commonly seen data processing environments, thousands of VMs can be operating on a computing node at any given time, and hundreds if not thousands of such nodes may be operational in the data processing environment at any given time. Furthermore, VMs are frequently created, reconfigured, or destroyed in data processing environments, and computing nodes are routinely brought online and offline. For each computing node to keep accurate and current records of all other receivers interested in multicasting is a monumental task, which requires a significant amount of computing resources—at each computing node.

The multi-unicast based overlay multicast method of multicasting is error-prone, maintenance-heavy, and a significant drain on computing resources in a data processing environment. Furthermore, the multi-unicast based overlay multicast method of multicasting is not a scalable method because of the explosive growth in the amount of information to keep up at each computing node with every addition or change of a computing node or a VM. The multi-unicast based overlay multicast method of multicasting is a workaround for multicasting in overlays but lacks the ability to meet the performance requirements in any sizeable overlay network.

SUMMARY

An embodiment includes a method for logical multicasting in overlay networks, the method comprising. The embodiment receives, at a data processing system, an original unicast packet from a first component in a first computing node in an overlay network, where the received original unicast packet was unicast by the first computing node only to the data processing system, and where a multicast data structure for the overlay network is maintained only by the data processing system, the multicast data structure containing information of each receiver that is configured to receive unicast packets during logical multicasting in the overlay network. The embodiment selects, from a set of subscriber receivers in the multicast data structure, a subset of the subscriber receivers. The embodiment unicasts a copy of the received original unicast packet to each subscriber receiver in the subset. An advantage of the embodiment is that the embodiment relieves each computing node from maintaining the dynamic information about multicast senders and receivers active at any given time in the overlay.

Another embodiment further evaluates a policy to determine whether the first component is associated with a subscriber receiver in the multicast data structure. The embodiment adds, responsive to the evaluating being negative, the first component as a subscriber receiver in the multicast data structure. An advantage of the embodiment is that the embodiment prevents duplicate entries in the multicast data structure.

Another embodiment further evaluates a policy to determine whether the first component is allowed to multicast in the overlay network, where the selecting is responsive to the evaluating being affirmative. An advantage of the embodiment is that the embodiment prevents unauthorized components from multicasting in the overlay.

In another embodiment, the subset includes at least one subscriber receiver excluding the first component. An advantage of the embodiment is that the embodiment multicasts only when there is at least one other target receiver of multicast messages in the overlay.

5 Another embodiment further receives, at the data processing system, from a second component in a second computing node in the overlay network, a request to receive multicast packets in the overlay network. The embodiment joins, responsive to a policy allowing the second component to be joined, the second component as a subscriber receiver in the multicast data structure. The embodiment sets, corresponding to the second component, a privilege value in the multicast data structure, wherein the privilege value is indicative of an ability of the second component to send data for multicasting in the overlay network. An advantage of the embodiment is that the embodiment allows the multicast data structure to change in compliance with multicasting policies.

Another embodiment further receives, at the data processing system, from a second component in a second computing node in the overlay network, a request to join the multicast data structure. The embodiment rejects, responsive to a policy disallowing the second component from being joined, the request. The embodiment notifies the second component about the request being rejected. An advantage of the embodiment is that the embodiment enables selectively changing the multicast data structure.

Another embodiment further receives, at the data processing system, from a second component in a second computing node in the overlay network, a request to stop receiving multicast packets in the overlay network. The embodiment removes, responsive to a policy allowing the second component to be removed, the second component as a subscriber receiver from the multicast data structure. An advantage of the embodiment is that the embodiment eliminates inactive receivers from the multicast data structure to keep the data structure current.

Another embodiment further determines, at the data processing system, whether the multicast data structure contains any remaining subscriber receivers after the removing of the second component. The embodiment notifies, responsive to no subscriber receivers remaining in the multicast data structure after the removing of the second component, a set of senders in the overlay network that the multicast data structure is empty. An advantage of the embodiment is that the embodiment prevents unnecessary multicasting in the overlay when there are no active receivers of the multicast in the overlay.

Another embodiment further causes, responsive to the notifying, a sender in the set of senders to block a request to multicast a packet from a virtual machine (VM) that communicates with the sender. An advantage of the embodiment is that the embodiment enables a computing node to self-restrict unnecessary multicast transmissions when no active receivers are present in the overlay.

In another embodiment, the first component comprises a virtual switch. The embodiment configures the first component, to determine whether any local VM other than a first VM at the first computing node is configured to receive multicast packets in the overlay network, wherein the first VM sends a packet to the first component causing the original unicast packet to be unicast to the data processing system. The embodiment forwards, responsive to at least one local VM other than the first VM at the first computing node being configured to receive multicast packets in the overlay network, the packet to the at least one local VM. An advantage of the embodiment is that the embodiment enables local distribution of locally produced multicast packets.

In another embodiment, the first component comprises a virtual switch. The embodiment configures the first component to receive, from a first VM operating at the first computing node, a request to receive multicast packets in the overlay network. The embodiment causes the first component to send to the data processing system a join request, wherein the join request is usable at the data processing system to add the first VM as a subscriber receiver in the multicast data structure. An advantage of the embodiment is that the embodiment enables existing components at a computing node to multicast using the data processing system.

In another embodiment, the first component comprises a virtual switch. The embodiment configures the first component to receive, from a first VM operating at the first computing node, a request to stop receiving multicast packets in the overlay network. The embodiment causes, responsive to the first VM being a subscriber receiver, the first component to send to the data processing system a leave request, wherein the leave request is usable at the MSC to remove the first VM as the subscriber receiver from the multicast data structure. An advantage of the embodiment is that the embodiment enables existing components at a computing node to multicast without locally maintaining the information about all active senders or receivers in the overlay.

Another embodiment further configures a second component in a second computing node to receive, from a second VM operating at the second computing node, a request to stop receiving multicast packets in the overlay network. The embodiment configures the second component to determine whether any local VM other than the second VM in the second computing node is configured to receive multicast packets in the overlay network. The embodiment causes, responsive to at least one local VM in the second computing node remaining configured to receive multicast packets, the second component to modify a status of the second VM, wherein the modified status of the second VM prevents the second component from sending to the second VM a logically multicast packet received by the second component. An advantage of the embodiment is that the embodiment enables existing components at a computing node to multicast without locally maintaining the information about all active senders or receivers in the overlay.

Another embodiment includes a method for logical multicasting in overlay networks. The embodiment receives at a first time, at a first component of a first computing node in an overlay network, from a first virtual machine (VM) operating at the first computing node, a request to receive multicast packets in the overlay network, wherein a multicast data structure for the overlay network is maintained only by a data processing system, and wherein the multicast data structure contains information of each receiver that is configured to receive unicast packets during logical multicasting in the overlay network. The embodiment sends a join request to the data processing system, wherein the join request is usable at the data processing system to add the first VM as a subscriber receiver in a multicast data structure. An advantage of the embodiment is that the embodiment relieves each computing node from maintaining the dynamic information about all multicast senders and receivers active at any given time in the overlay.

Another embodiment further receives, from a second VM operating at the first computing node, a request to stop receiving multicast packets in the overlay network Another embodiment further modifies at the first component, responsive to determining that the first VM remains configured to receive multicast packets in the overlay network, a status of the second VM, wherein the modified status of the second VM prevents the first component from sending to the second VM a logically multicast packet received by the first component. An advantage of the embodiment is that the embodiment enables existing components at a computing node to multicast without locally maintaining the information about all active senders or receivers in the overlay.

Another embodiment further receives at a second time, from the first VM, a request to stop receiving multicast packets in the overlay network. The embodiment sends a leave request to the data processing system, wherein the leave request is usable at the data processing system to remove the first VM as the subscriber receiver from the multicast data structure. An advantage of the embodiment is that the embodiment enables existing components at a computing node to multicast without locally maintaining the information about all active senders or receivers in the overlay.

Another embodiment further receives, at the first component, from a first VM, a packet. The embodiment unicasts from the first component to the data processing system, an original unicast packet corresponding to the packet. The embodiment determines at the first component, whether any local VM other than the first VM at the first computing node is configured to receive multicast packets in the overlay network. The embodiment forwards, responsive to at least one local VM other than the first VM at the first computing node being configured to receive multicast packets in the overlay network, the packet to the at least one local VM. An advantage of the embodiment is that the embodiment enables local distribution of locally produced multicast packets.

Another embodiment further receives, at the first component, a notification from the data processing system, the notification informing the first component that no subscriber receivers remain in the multicast data structure. The embodiment receives, at the first component, from a second VM a request to multicast a packet in the overlay network. The embodiment blocks, at the first component, responsive to receiving the notification, the request to multicast the packet. An advantage of the embodiment is that the embodiment enables a computing node to self-restrict unnecessary multicast transmissions when no active receivers are present in the overlay.

Another embodiment includes a computer program product for logical multicasting in overlay networks. An advantage of the embodiment is that the embodiment relieves each computing node from maintaining the dynamic information about all multicast senders and receivers active at any given time in the overlay.

Another embodiment includes a computer system for logical multicasting in overlay networks. An advantage of the embodiment is that the embodiment enables existing components at a computing node to multicast without locally maintaining the information about all active senders or receivers in the overlay.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
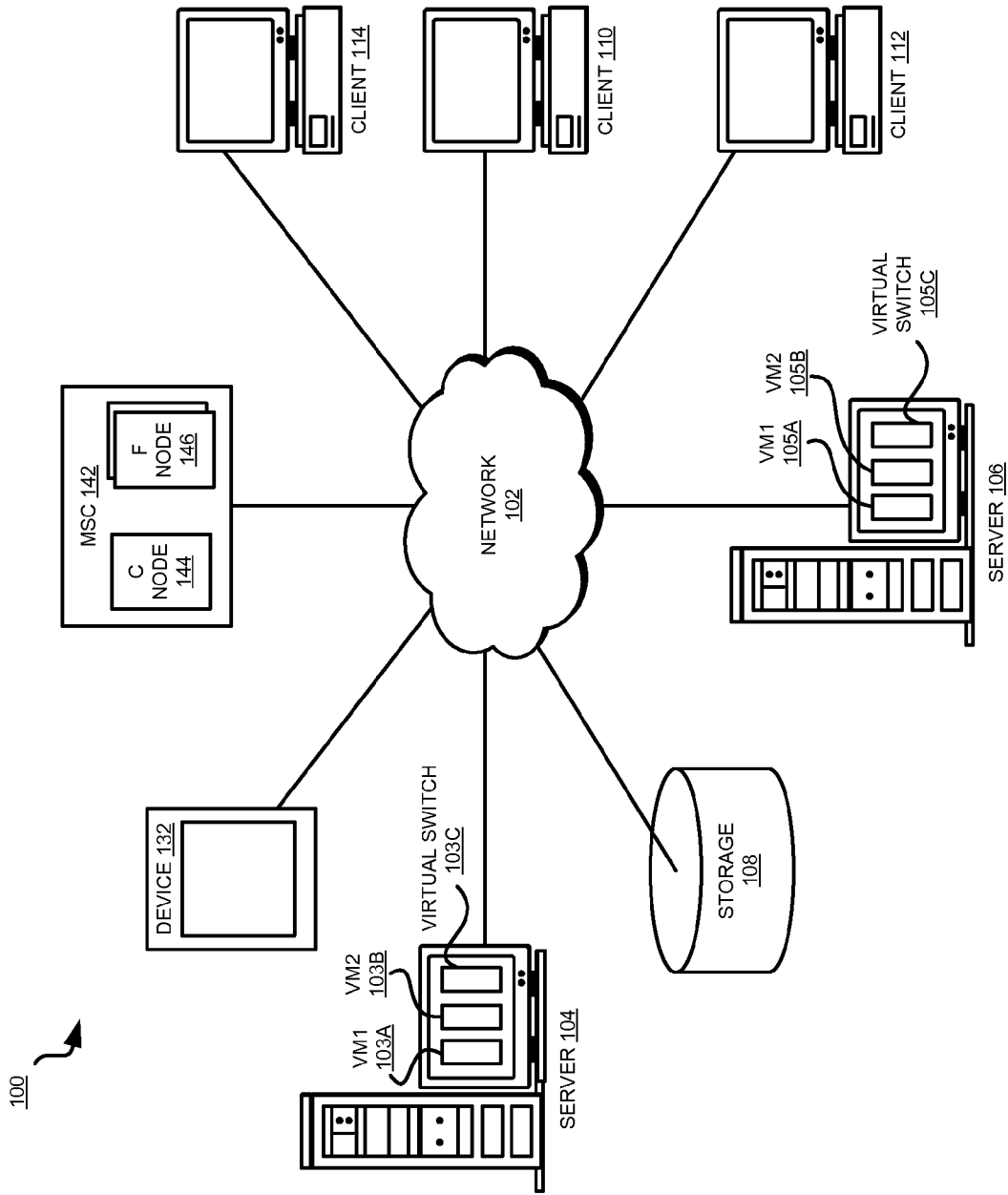
FIG. 1 depicts a block diagram of a network of data processing systems in which illustrative embodiments may be implemented.

The illustrative embodiments used to describe the invention generally address and solve the above-described problems and other problems related to overlay multicasting. The illustrative embodiments provide a method, system, and computer program product for logical multicasting in overlay networks.

An embodiment configures a Multicast Service Cluster (MSC) in the overlay. An MSC comprises one or more computing nodes specifically dedicated to the task of managing and performing multicasting in an overlay network. An embodiment configures the MSC into a control component and a forwarding component.

For example, if a single computing node is configured as an MSC, some computing resources of the node can be configured as a control component, e.g., a VM operating as a control component, and some computing resources of the node can be configured as one or more forwarding components, e.g., one or more VMs operating as the forwarding components.

As another example, if a cluster of computing nodes is configured as an MSC, some computing nodes in the cluster can be configured as a control component and some computing nodes in the cluster can be configured as one or more forwarding components. Hereinafter, a control component in an MSC is referred to as a "control node" or a "C node". Likewise, hereinafter, a forwarding component in an MSC is referred to as a "forwarder node" or an "F node".

However the MSC is configured, a control node performs the function of creating and maintaining a multicast tree data structure. The multicast tree can be, but need not be, any hierarchical data structure. For example, the multicast tree data structure can take the form of a list, database records, or other hierarchical or non-hierarchical forms within the scope of the illustrative embodiments.

A forwarder node performs the function of constructing a set of unicast packets containing the data intended for multicast. The forwarder node forwards the unicast packets from the set to the participating receivers identified in the multicast tree.

Logical multicasting is simulating a multicast transmission by unicasting to each multicast receiver. A forwarder node performs logical multicasting in the overlay.

The size of the multicast tree is a number of receivers to whom the data has to be unicast in the logical multicasting. A volume of multicasting in the overlay comprises an amount of data that has to be logically multicast over a period, a number of unicast transmissions that have to be performed over the period, or a combination thereof. A multicasting demand in the overlay during a given period is a function of the size of the multicast tree during the period, an actual or expected volume of multicasting over the period, or a combination thereof.

The number of forwarder nodes operating in an MSC at any given time is a function of a multicasting demand in the overlay and a performance requirement in the overlay. Additional forwarder nodes can be created or brought online with increasing multicasting demand, higher performance requirements, or both. Conversely, excess forwarder nodes can be spun down or shutdown with decreased multicasting demand, reduced performance requirements, or both. Generally, any number of forwarder nodes can be created and operated in the MSC within the scope of the illustrative embodiments.

A control node receives requests, e.g., from virtual switches, to join or leave the multicast tree. The control node creates and updates the multicast tree according to such requests.

A receiver is a component at a computing node that receives a packet from a forwarder in the MSC. A sender is a component at a computing node that sends data for multicasting to a forwarder in the MSC. For example, a VM in the computing node, i.e., a local VM, informs the virtual switch that the VM is interested in participating in multicasting. Similarly, another VM in the same or different computing node can inform the corresponding virtual switch that the VM does not, or no longer, wants to receive multicast communications.

The virtual switch communicates such information to the MSC via join or leave requests. In one embodiment, the virtual switch communicates the information about a VM joining or leaving the overlay multicasting to the MSC using Internet Group Management Protocol (IGMP) messaging or Multicast Listener Discovery (MLD) protocol messaging. IGMP and MLD are Multicast Group Membership Discovery (MGMD) protocols. In another embodiment, the virtual switch communicates the information about a VM joining or leaving the overlay multicasting to the MSC using any suitable data communication with the MSC. In a non-limiting example embodiment, the virtual switch sends an IP packet to the MSC and sets a flag or indicator in a header of the IP packet to different values to indicate the intention of a VM to join or leave the overlay multicasting.

A virtual switch receives unicast packets from the MSC during logical multicasting, and distributes the packets to local receivers, such as local VMs. In an opt-in embodiment, the virtual switch distributes the packets to those local VMs that have informed the receiver that they are interested in participating in multicasting. In an opt-out embodiment, participation in multicasting can be a default configuration of a VM configured in a node. In such a case, the virtual switch forwards the received unicast to all local VMs except those VMs that have opted out of multicasting.

If a sender component, e.g., a local VM, produces data that the VM wants to multicast, the virtual switch receives such data from the sender VM. If any local VMs, other than the VM producing the data, are configured to participate in multicasting, the virtual switch locally distributes the data to such local VMs.

The virtual switch determines whether the data should be sent to the MSC for multicasting in the overlay. For example, in one embodiment the MSC informs the virtual switch when the multicast tree at the MSC is empty, i.e., no receivers are configured to receive the unicast packets in logical multicasting. When the virtual switch has the information that the multicast tree at the MSC is empty, there is no reason for the virtual switch to send the VM's data to the MSC for multicasting because the MSC will not be able to perform the logical multicast in the overlay. Accordingly, the virtual switch does not send the data to the MSC. Otherwise, the virtual switch communicates the data to the MSC.

A method of an embodiment described herein, when implemented to execute on a device or data processing system, comprises substantial advancement of the functionality of that device or data processing system in multicasting in overlay networks. For example, where prior-art requires each computing node to manage the neighborhood information for the multi-unicast method of overlay multicasting, an embodiment relieves the computing node from such burden and offloads the multicasting tree management responsibility to an MSC. Operating in a manner described herein, an embodiment significantly reduces the amount of overhead imposed on the computing nodes for simulating multicasting in overlay networks. Such manner of logical multicasting for overlay networks is unavailable in presently available devices or data processing systems. Thus, a substantial advancement of such devices or data processing systems by executing a method of an embodiment improves the performance and reduces errors in multicasting in overlay networks.

The illustrative embodiments are described with respect to certain networking components, node components, protocols, packets, configurations, policies, conditions, packets, headers, flags, identifiers, indications, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
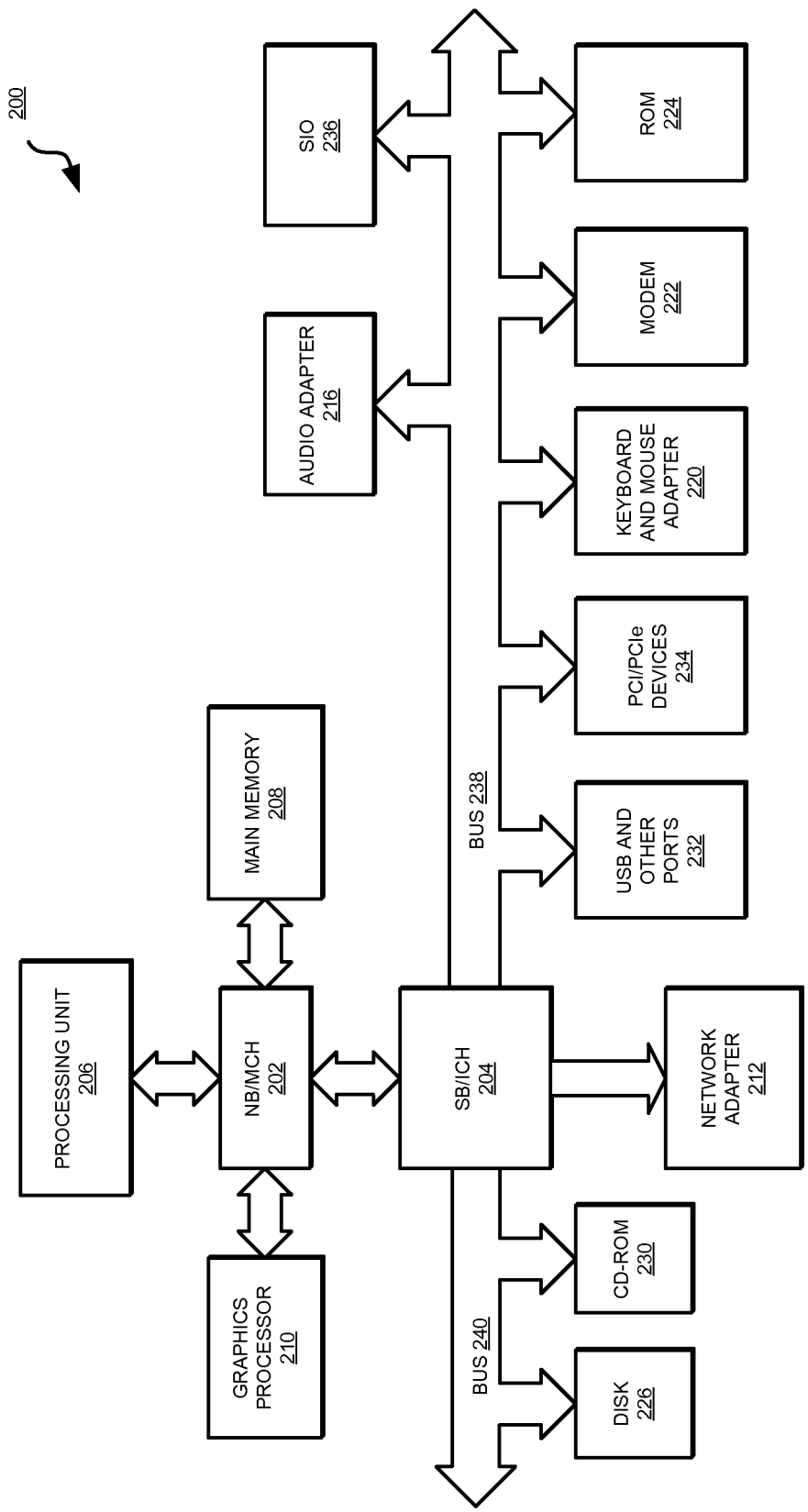
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device that can be configured for communicating over an overlay. Any software application described as executing in another data processing system in FIG. 1 can be configured to execute in device 132 in a similar manner. Any data or information stored or produced in another data processing system in FIG. 1 can be configured to be stored or produced in device 132 in a similar manner. Network 102 forms an underlay network over which the overlay is built. MSC 142 is an example MSC according to an embodiment and operates over the overlay. MSC 142 implements the functions of one or more embodiments described herein in the form of a software application or a combination of software and hardware. For example, according to one embodiment, control node 144 comprises hardware data processing system resources executing a software implementation of an embodiment. Similarly, according to one embodiment, each of one or more forwarder nodes 146 comprises hardware data processing system resources executing a software implementation of an embodiment. VM 103A and VM 103B, labeled "VM1" and "VM2", respectively, in computing node 104 are depicted as VMs only as examples, and can take the form of a VM or any other suitable hardware or software configuration that can originate multicast packets, can be a final destination of a multicast packet, or both, within the scope of the illustrative embodiments. Embodiments described herein with respect to VMs are similarly adaptable with other suitable applications accordingly. Virtual switch 103C communicates with MSC 142. MSC 142 maintains a multicast tree. Other suitable structures that are configurable for a similar purpose can replace virtual switch 103C in computing node 104 within the scope of the illustrative embodiments. VM 105A and VM 105B, labeled "VM1" and "VM2", respectively, in computing node 106 can similarly take the form of a VM or any other suitable hardware or software configuration that can originate multicast packets, can be a final destination of a multicast packet, or both. Virtual switch 105C communicates with MSC 142. Other suitable structures that are configurable for a similar purpose can replace virtual switch 105C in computing node 106. Generally, within the scope of the illustrative embodiments, a virtual switch can take the form of any suitable hardware or software configuration that can transmit unicast packets to MSC 142 and can receive unicast packets from MSC 142.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and packets. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 or MSC 142 in FIG. 1 in which computer usable program code or instructions implementing the processes of the illustrative embodiments may be located. Data processing system 200 is described as a computer only as an example, without being limited thereto. Implementations in the form of other devices, such as device 132 or MSC 142 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as applications (not shown) in virtual switches 103C and 105C, application (not shown) in MSC 142, application (not shown) in control node 144, and application (not shown) in forwarder node 146 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
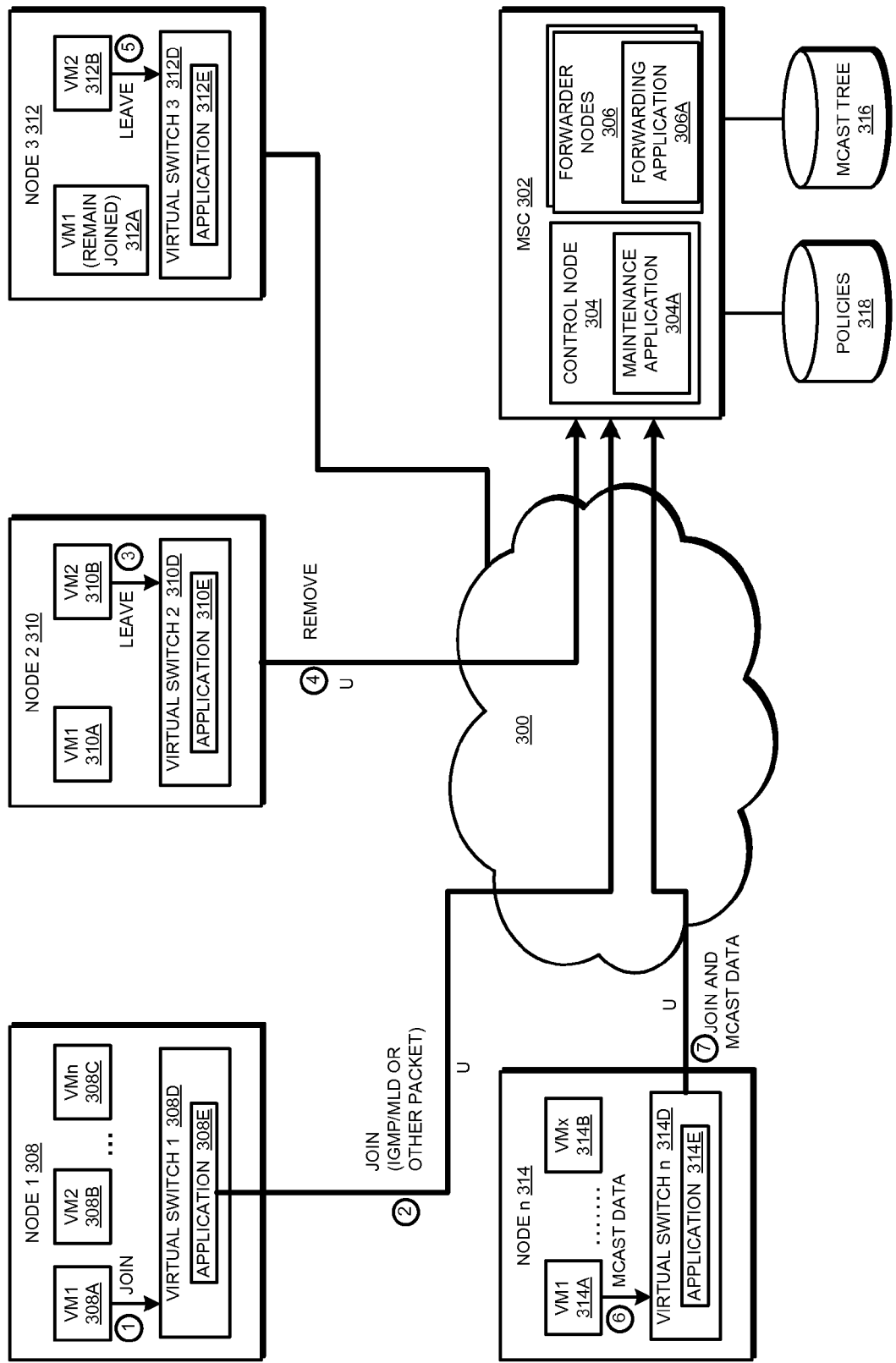
FIG. 3 depicts a block diagram of an example configuration for logical multicasting in overlay networks in accordance with an illustrative embodiment.

With reference to FIG. 3, this figure depicts a block diagram of an example configuration for logical multicasting in overlay networks in accordance with an illustrative embodiment. Network 300 is an overlay network operating over underlay network 102 of FIG. 1. MSC 302, control node 304, and one or more forwarder nodes 306 are examples of MSC 142, control node 144, and forwarder node 146, respectively, in FIG. 1. Application 304A is an application to maintain a multicast tree, and implements an embodiment of certain functions thereof, as described herein, in control node 304. Application 306A is a forwarding application, and implements an embodiment of certain functions thereof, as described herein, in forwarder node 306. Applications 304A and 306A can be implemented in any suitable manner, in any location in MSC 302 within the scope of the illustrative embodiments. For example, one implementation implements applications 304A and 306A together as a single application (not shown) in MSC 302.

Node 308, labeled "node 1" is an example of server 104 and hosts any number of VMs or other suitable hardware and/or software configurations in the manner of VMs 103A-B in FIG. 1. For example, node 308 comprises VM 308A, labeled "VM1", VM 308B, labeled "VM2", through VM 308C, labeled "VMn". Virtual switch 308D, labeled "virtual switch 1" or "VS1", or another suitable hardware and/or software configuration, facilitates communications with MSC 302 at node 308. Application 308E implements an embodiment of certain functions thereof, as described herein, in virtual switch 308D.

Node 310, labeled "node 2" is an example of server 106 and hosts any number of VMs or other suitable hardware and/or software configurations in the manner of VMs 105A-B in FIG. 1. For example, node 310 comprises VM 310A, labeled "VM1" through VM 310B, labeled "VM2". Virtual switch 310D, labeled "virtual switch 2" or "VS2", or another suitable hardware and/or software configuration, facilitates communications with MSC 302 at node 310. Application 310E implements an embodiment of certain functions thereof, as described herein, in virtual switch 310D.

Node 312, labeled "node 3" is an example of server 104 or 106 in a similar manner and hosts any number of VMs or other suitable hardware and/or software configurations in the form of VM 312A, labeled "VM1" through VM 312B, labeled "VM2". Virtual switch 312D, labeled "virtual switch 3" or "VS3", or another suitable hardware and/or software configuration, facilitates communications with MSC 302 at node 312. Application 312E implements an embodiment of certain functions thereof, as described herein, in virtual switch 312D.

Node 314, labeled "node n" is an example of server 104 or 106 in a similar manner and hosts any number of VMs or other suitable hardware and/or software configurations in the form of VM 314A, labeled "VM1" through VM 314B, labeled "VMx". Virtual switch 314D, labeled "virtual switch n" or "VSn", or another suitable hardware and/or software configuration, facilitates communications with MSC 302 at node 314. Application 314E implements an embodiment of certain functions thereof, as described herein, in virtual switch 314D.

In this figure and the corresponding description, an opt-in type of operation is described as an example. From this disclosure, those of ordinary skill in the art will be able to adapt an embodiment to operate in an opt-out type of operation, and the same is contemplated within the scope of the illustrative embodiments.

In an example operation, VM 308A informs virtual switch 308D that VM 308A wants to join or receive (1) multicast messaging. In response to receiving such information from VM 308A, application 308E causes virtual switch 308D to send an IGMP packet, or an MLD packet, or by using another type of packet in the manner described herein, to MSC 302 over unicast (2)(U), to indicate that VM 308A—reachable via virtual switch 308D—should be joined in multicasting tree 316 maintained by MSC 302.

In another example operation, VM 310B informs virtual switch 310D that VM 310B wants to leave or stop receiving (3) multicast messaging. In response to receiving such information from VM 310B, and if no other VM in node 310 is joined or configured to receive multicast messaging, application 310E causes virtual switch 310D to send an IGMP packet, or an MLD packet, or by using another type of packet in the manner described herein, to MSC 302 over unicast (4)(U), to indicate that VM 310B—reachable via virtual switch 310D—should be removed from multicasting tree 316.

In another example operation, VM 312B informs virtual switch 312D that VM 312B wants to leave or stop receiving (5) multicast messaging. In response to receiving such information from VM 312B, application 312E determines that another VM in the node—VM 312A is joined or configured to receive multicast messaging. Therefore, at least for servicing VM 312A virtual switch 312D has to remain accessible in multicasting tree 316. Accordingly, application 312E causes virtual switch 312D to send removal information to MSC 302 to remove VM 312B as a receiver while keeping VM 312A joined in multicasting tree 316.

In another example operation, VM 314A sends (6) virtual switch 314D data for multicasting in the overlay. In response to receiving such information from VM 314A, and if virtual switch 314D is not already joined or configured to receive multicast messaging, application 314E causes virtual switch 314D to send an packet in the manner described herein, to MSC 302 over unicast (7)(U). The packet indicates to MSC 302 that VM 314A should be joined as a sender in multicasting tree 316, and the data included in the packet in transmission (7) should be multicast in the overlay.

Control node 304 receives the packets transmitted in unicast transmission (2), (4), and (7). Control node 304 uses one or more policies from policies repository 318 to determine how to process these packets. For example, under one example circumstance, one or more policies might not permit VM 308A to join multicasting tree 316 as a receiver of multicast packets, as a sender of multicast packets, or both. Under such circumstances, application 304A causes control node 304 to reject all or a part of the join request received from virtual switch 308D. Under another example circumstance, one or more policies might permit VM 308A to join multicasting tree 316 as a receiver of multicast packets, as a sender of multicast packets, or both. Under such circumstances, application 304A causes control node 304 to join VM 308A in multicast tree 316 as an active receiver of multicast packets, an active sender of multicast packets, or both, respectively, in the overlay.

Similarly, according to policies 318, application 304A in control node 304 may accept or reject the remove request from VM 310B. Depending upon policies 318 in effect at the time transmission (7) is received, application 304A in control node 304 may accept or reject the join request from VM 314A, may or may not permit the data in transmission (7) to be multicast in the overlay, or some combination of these various outcomes.

Figure 4:
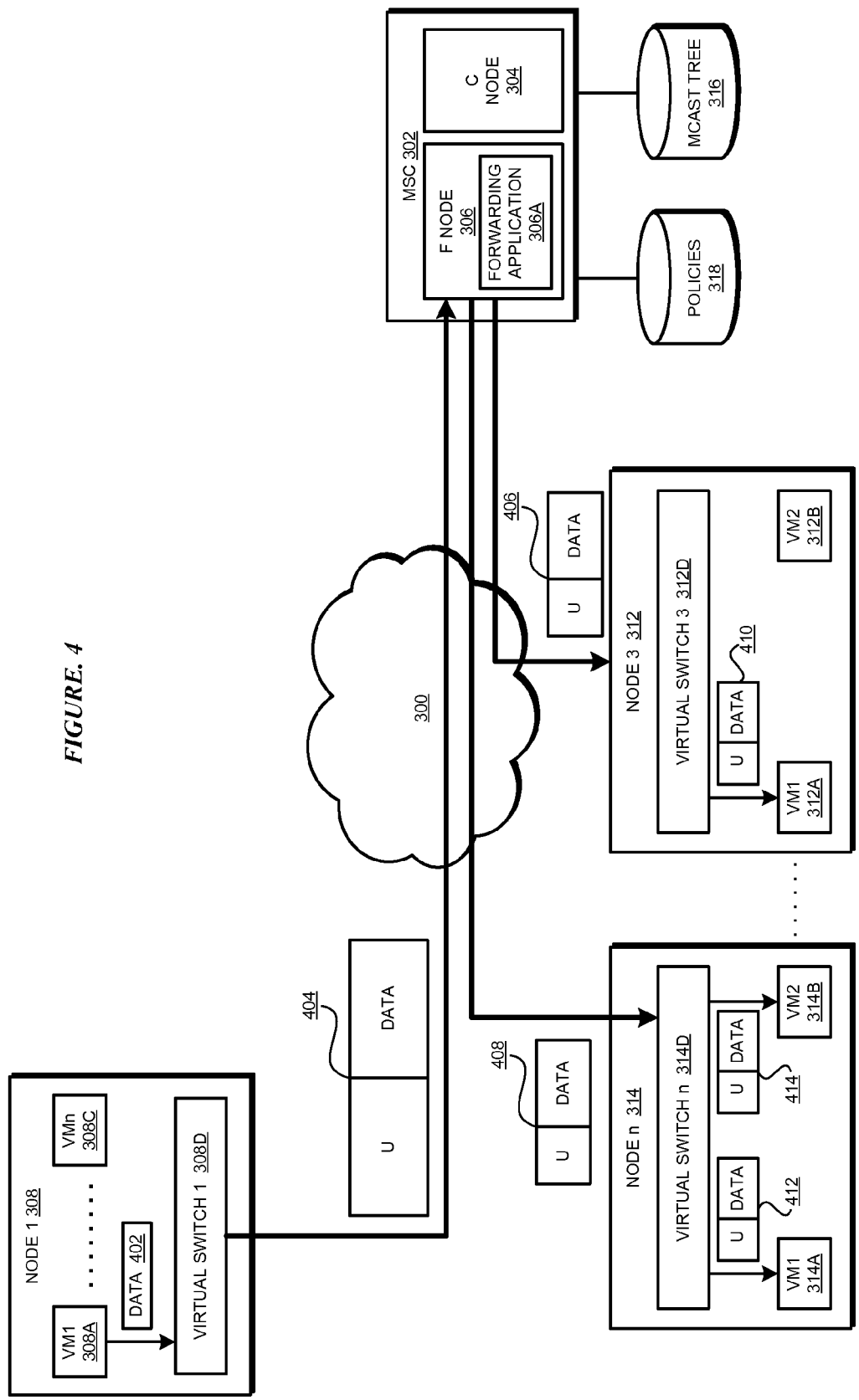
FIG. 4 depicts a block diagram of an example logical multicasting operation in an overlay network in accordance with an illustrative embodiment.

With reference to FIG. 4, this figure depicts a block diagram of an example logical multicasting operation in an overlay network in accordance with an illustrative embodiment.

VM 308A wants to multicast data 402 in overlay 300. VM 308A sends data 402 to virtual switch 308D. Virtual switch 308D prepares unicast packet 404 with data 402 and unicasts packet 404 to MSC 302. In one embodiment, as a part of preparing unicast packet 404, virtual switch 308D encapsulates data 402, e.g., with suitable header information, to send to MCS 302.

Forwarding application 306A operating in forwarder node 306 receives packet 404. Application 306A causes forwarder node 306 to creates copies of packet 404 and address one copy each to active receivers in multicast tree 316. Within the scope of the illustrative embodiments, a copy of a packet includes the same payload but potentially differing header information to reach different destinations. In one embodiment, application 306A selects a subset of the active set of receivers from multicast tree 316 by applying a policy from policies 318 to the set of active receivers.

Applications 306A causes forwarder node 306 to unicast copy 406 of packet 404 to active receivers in node 312 via virtual switch 312D operating in node 312. Similarly, application 306A causes forwarder node 306 to unicast copy 408 of packet 404 to active receivers in node 314 via virtual switch 314D operating in node 314. Note that packets 406 and 408 are suitably configured to reach their respective destination receivers in overlay 300, and carry the data of packet 404 to those destination receivers.

As described with respect to FIG. 3, VM 312B has removed itself from receiving multicast packets. Virtual switch 312D keeps track of which local VMs in the local node are participating in multicasting. In the depicted example, virtual switch 312D has information that VM 312B is not participating but VM 312A is participating in multicasting. Accordingly, virtual switch 312D sends packet 406 or a version thereof to VM 312A as packet 410, but not to VM 312B.

Similarly, virtual switch 314D has information that VM 314A and 314B are both participating in multicasting. Accordingly, virtual switch 314D sends packet 408 or a version thereof to VM 314A as packet 412, and to VM 314B as packet 414. As demonstrated by this example operation, in a computing node in an overlay, not only a VM, but a virtual switch also can be a receiver of multicast packets in a multicast tree. Similarly, a VM, a virtual switch, or both, can also be senders of multicast packets in a multicast tree. Other manifestations to replace a VM or a virtual switch in their respective roles described herein are contemplated within the scope of the illustrative embodiments.

Figure 5:
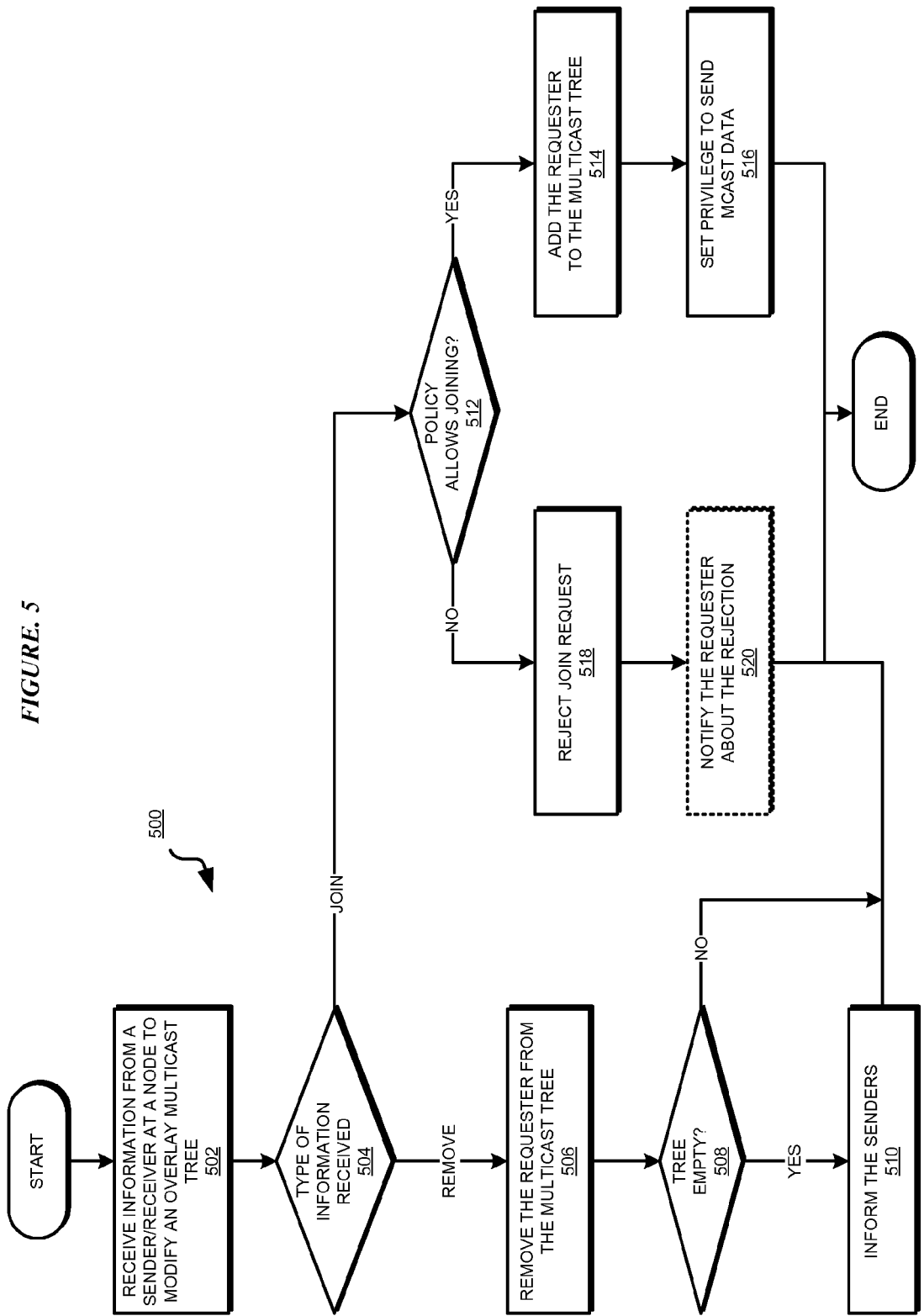
FIG. 5 depicts a flowchart of an example process for logical multicasting in overlay networks in accordance with an illustrative embodiment.

With reference to FIG. 5, this figure depicts a flowchart of an example process for logical multicasting in overlay networks in accordance with an illustrative embodiment. Process 500 can be implemented in multicast tree maintenance application 304A in FIG. 3.

The application receives information from a sender or a receiver at a node to modify a multicast tree for an overlay, such by joining or removing the sender or receiver from the multicast tree (block 502). For example, a receiver VM at a node may send such a request via a virtual switch at the node. Likewise, a sender VM may send a request to join via a virtual switch at a node. The application determines a type of the information received (block 504).

If the information requests removal of the receiver from the multicast tree ("Remove" path of block 504), the application removes the requester from the multicast tree (block 506). The application determines whether the removal has caused the multicast tree to become empty, i.e., to have no active receivers remaining in the multicast tree (block 508).

If the multicast tree is not empty ("No" path of block 508), the application ends process 500 thereafter. If the multicast tree is empty ("Yes" path of block 508), the application informs the known senders, e.g., sender VMs, virtual switches, or some combination thereof, in the overlay that the multicast tree is empty (block 510). The application ends process 500 thereafter.

The informing action of block 510 can be accomplished using any suitable packet type. One reason to inform the senders in the overlay that the multicast tree is empty is to enable the senders to make a preliminary determination in sending future multicast requests. For example, in the future, a virtual switch receives a request from a VM to send data for multicasting, e.g., data 402 in FIG. 4. If the virtual switch has the information that the multicast tree is empty, the virtual switch need not send the data, e.g., data 402, to the MSC because the MSC will not be able to multicast the data to any receivers.

Returning to block 504, if the type of information is a request to join the multicast tree ("Join" path of block 504), the application determines whether a policy allows the requester to join the multicast tree (block 512). There can be many implementation-specific reasons to exclude a VM or virtual switch from joining the multicast tree, including but not limited to security concerns, need to isolate some nodes from multicasting, and many other reasons.

If the policy allows the requester to join ("Yes" path of block 512), the application adds the receiver to the multicast tree (block 514). The application also sets a privilege information for the added requester to indicate whether the requester is allowed to send data, e.g., data 402 in FIG. 4, for multicasting (block 516). The application ends process 500 thereafter. For example, a requester may be allowed to operate as a receiver and receive multicast packets as well as operate as a sender and submit data for multicasting, while another requester may be allowed to only receive multicast packets but not send data for multicasting. In some cases, a requester may not be allowed to receive multicast packets but be allowed to submit data for multicasting. Again, a variety of implementation-specific reasons can require such privilege settings.

If the policy does not allow the requester to join ("No" path of block 512), the application rejects the requester's request to join the multicast tree (block 518). The application optionally notifies the requester about the rejection (block 520). The application ends process 500 thereafter.

Figure 6:
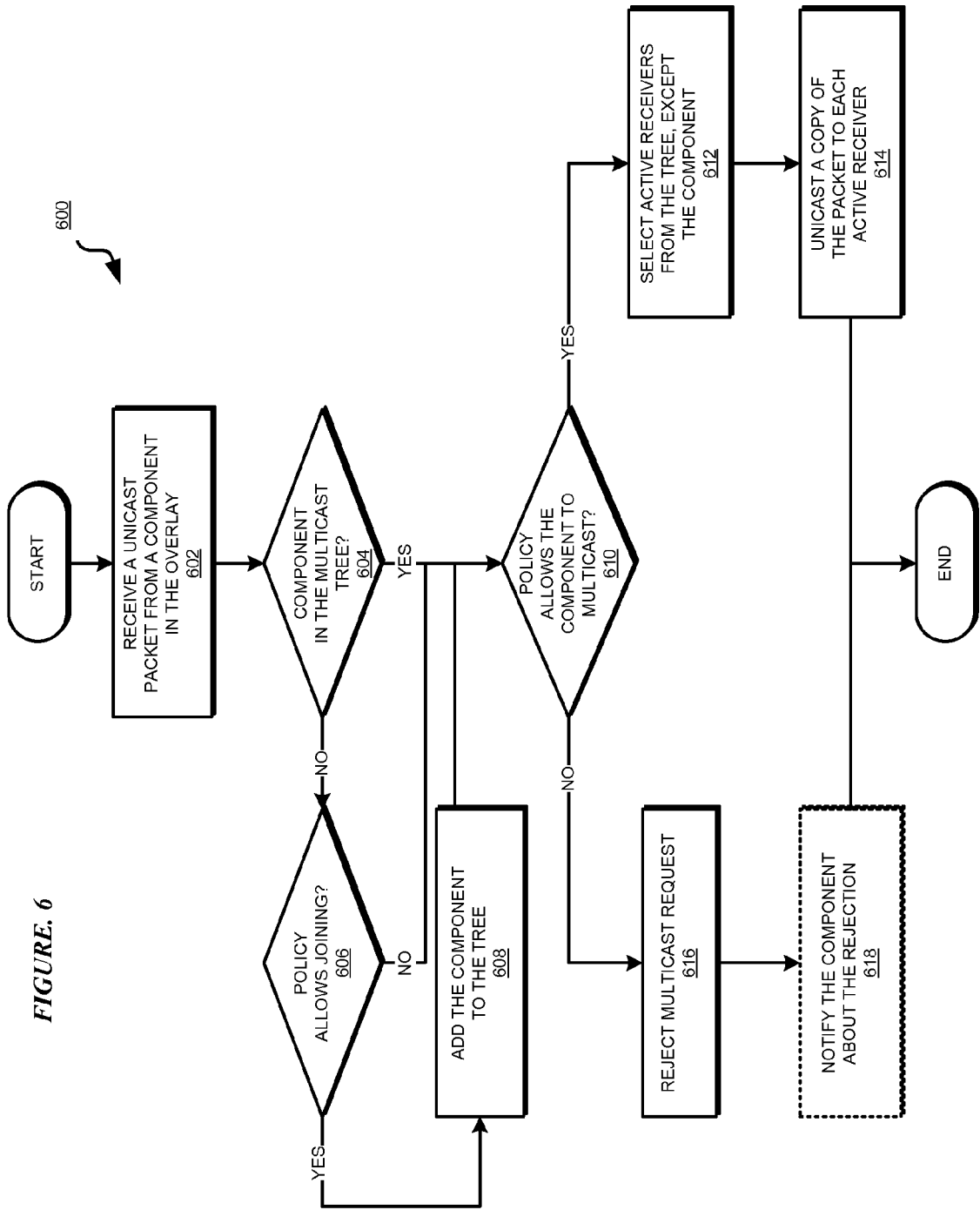
FIG. 6 depicts a flowchart of an example process for logical multicasting in overlay networks in accordance with an illustrative embodiment.

With reference to FIG. 6, this figure depicts a flowchart of an example process for logical multicasting in overlay networks in accordance with an illustrative embodiment. Process 600 can be implemented in multicast tree forwarding application 306A in FIGS. 3 and 4.

The application receives a unicast packet from a component in the overlay (block 602). Within the scope of the illustrative embodiments, the component can be a VM or virtual switch operating as a sender as described herein, or any other component that is capable of similar unicasting operations.

The application determines whether the component is present in the multicast tree (block 604). If the component is not present in the multicast tree ("No" path of block 604), the application determines whether a policy allows the component to be joined in the multicast tree (block 606).

If a policy allows the component to be joined in the multicast tree ("Yes" path of block 606), the application adds the component to the multicast tree (block 608). Alternatively, at block 608, the application requests multicast tree maintenance application 304A to add the component to the multicast tree. The application then proceeds to block 610. If the policies do not allow the component to be joined in the multicast tree ("No" path of block 606), the application proceeds to block 610.

Returning to block 604, if the component is present in the multicast tree ("Yes" path of block 604), the application determines whether a policy allows the component to multicast in the overlay (block 610). If a policy allows the component to multicast in the overlay ("Yes" path of block 610), the application selects all or some of active receivers from the multicast tree, except the component (block 612).

The application unicasts a copy of the packet to each selected active receiver (block 614). The application ends process 600 thereafter.

If the policies do not allow the component to multicast in the overlay ("No" path of block 610), the application rejects the component's multicast request (block 616). Optionally, the application notifies the component about the rejection (block 618). The application ends process 600 thereafter.

Figure 7:
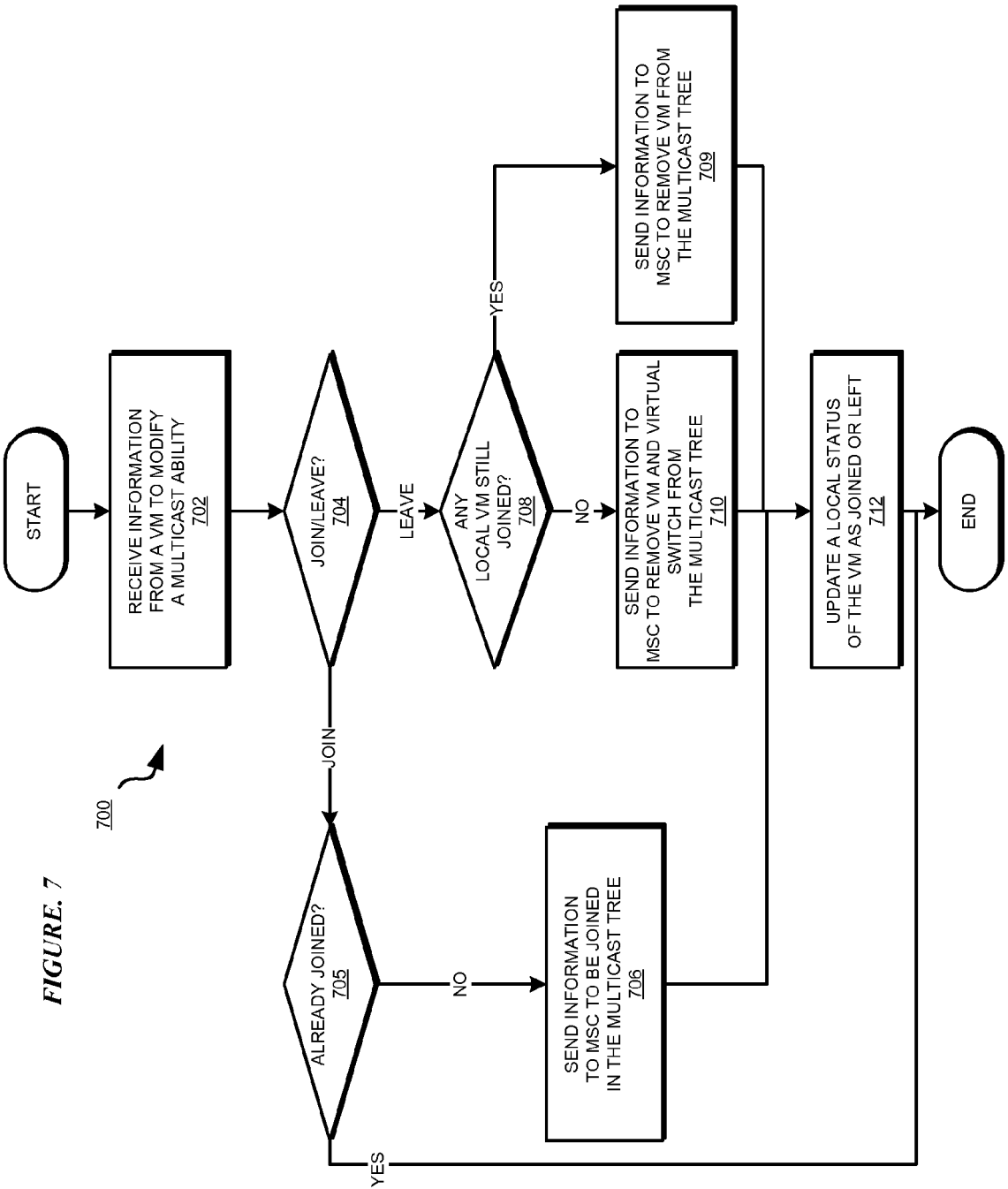
FIG. 7 depicts a flowchart of an example process for subscribing to or unsubscribing from a multicast tree in accordance with an illustrative embodiment.

With reference to FIG. 7, this figure depicts a flowchart of an example process for subscribing to or unsubscribing from a multicast tree in accordance with an illustrative embodiment. As a non-limiting example, process 700 can be implemented in a virtual switch, such as in any of applications 308E, 310E, 312E, or 314E in FIG. 3.

The application receives information from a local VM to modify a multicast ability of the VM (block 702). The application determines whether the VM seeks to join or leave the multicasting in the overlay (block 704).

If the VM seeks to join the multicasting in the overlay ("Join" path of block 704), the application determines whether the VM has already previously been joined (block 705). If the VM has previously joined ("Yes" path of block 705), the application ends process 700 thereafter. If the VM has not previously joined ("No" path of block 705), the application sends information to the MSC to join the receiver in the multicast tree (block 706). The application proceeds to block 712 thereafter.

If the VM seeks to leave the multicasting in the overlay ("Leave" path of block 704), the application determines whether any local VM still remains joined in the multicasting (block 708). If any local VM still remains joined in the multicasting ("Yes" path of block 708), the application sends information to the MSC to remove the requesting VM from the multicast tree (block 709). The application proceeds to block 712 thereafter.

If no local VM still remains joined in the multicasting ("No" path of block 708), the application sends information to the MSC to remove the requesting VM and the virtual switch from the multicast tree (block 710). The application updates at the receiver, a local status of the VM that sent the information of block 702, to indicate whether the VM has joined or left the multicasting according to that information (block 712). The application ends process 700 thereafter.

Figure 8:
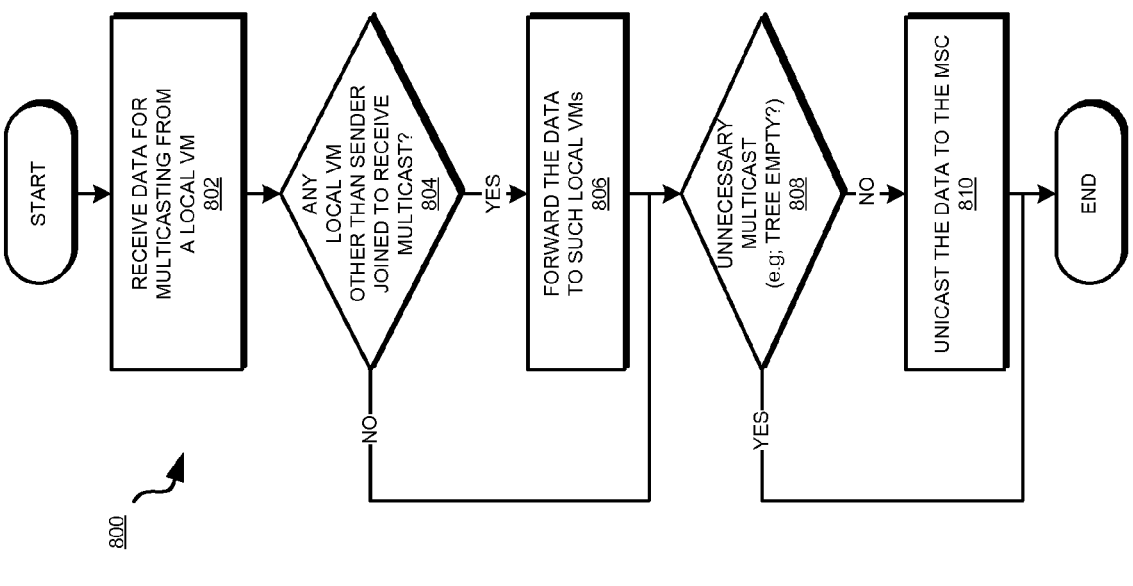
FIG. 8 depicts a flowchart of an example process for sending data for multicasting in an overlay network in accordance with an illustrative embodiment.

With reference to FIG. 8, this figure depicts a flowchart of an example process for sending data for multicasting in an overlay network in accordance with an illustrative embodiment. Process 800 can be implemented in a virtual switch, such as in any of applications 308E, 310E, 312E, or 314E in FIG. 3.

The application receives data for multicasting from a local VM (block 802). The application determines whether any local VMs other than the sender VM have joined to receive multicast packets (block 804).

If any local VMs other than the sender VM have joined to receive multicast packets ("Yes" path of block 804), the application sends or forwards the data received in block 802 to such local VMs (block 806). If no local VMs other than the sender VM have joined to receive multicast packets ("No" path of block 804), the application determines whether the data is for an unnecessary multicast (block 808). For example, a multicast is unnecessary if the multicast tree is empty. If the multicasting is unnecessary ("Yes" path of block 808), the application ends process 800 thereafter.

If the multicasting is not unnecessary ("No" path of block 808), the application unicasts the data of block 802 to the MSC (block 810). The application ends process 800 thereafter.

Thus, a computer implemented method, system or apparatus, and computer program product are provided in the illustrative embodiments for logical multicasting in overlay networks. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for logical multicasting in overlay networks, the method comprising:
   receiving, at a data processing system, an original unicast packet from a first component in a first computing node in an overlay network, wherein the first component comprises a virtual switch, wherein the received original unicast packet was unicast by the first computing node only to the data processing system, and wherein a multicast data structure for the overlay network is maintained only by the data processing system, the multicast data structure containing information of each receiver that is configured to receive unicast packets during logical multicasting in the overlay network;
   selecting, from a set of subscriber receivers in the multicast data structure, a subset of the subscriber receivers;
   unicasting a copy of the received original unicast packet to each subscriber receiver in the subset;
   configuring the first component, to determine whether any local virtual machine (VM) other than a first VM at the first computing node is configured to receive multicast packets in the overlay network, wherein the first VM sends a packet to the first component causing the original unicast packet to be unicast to the data processing system; and
   forwarding, responsive to at least one local VM other than the first VM at the first computing node being configured to receive multicast packets in the overlay network, the packet to the at least one local VM.

2. The method of claim 1, further comprising:
   evaluating a policy to determine whether the first component is associated with a subscriber receiver in the multicast data structure; and
   adding, responsive to the evaluating being negative, the first component as a subscriber receiver in the multicast data structure.

3. The method of claim 1, further comprising:
   evaluating a policy to determine whether the first component is allowed to multicast in the overlay network, wherein the selecting is responsive to the evaluating being affirmative.

4. The method of claim 1, wherein the subset includes at least one subscriber receiver excluding the first component.

5. The method of claim 1, further comprising:
   receiving, at the data processing system, from a second component in a second computing node in the overlay network, a request to receive multicast packets in the overlay network;
   joining, responsive to a policy allowing the second component to be joined, the second component as a subscriber receiver in the multicast data structure; and
   setting, corresponding to the second component, a privilege value in the multicast data structure, wherein the privilege value is indicative of an ability of the second component to send data for multicasting in the overlay network.

6. The method of claim 1, further comprising:
   receiving, at the data processing system, from a second component in a second computing node in the overlay network, a request to join the multicast data structure;
   rejecting, responsive to a policy disallowing the second component from being joined, the request; and
   notifying the second component about the request being rejected.

7. The method of claim 1, further comprising:
   receiving, at the data processing system, from a second component in a second computing node in the overlay network, a request to stop receiving multicast packets in the overlay network; and
   removing, responsive to a policy allowing the second component to be removed, the second component as a subscriber receiver from the multicast data structure.

8. The method of claim 7, further comprising:
   determining, at the data processing system, whether the multicast data structure contains any remaining subscriber receivers after the removing of the second component; and
   notifying, responsive to no subscriber receivers remaining in the multicast data structure after the removing of the second component, a set of senders in the overlay network that the multicast data structure is empty.

9. The method of claim 8, further comprising:
   causing, responsive to the notifying, a sender in the set of senders to block a request to multicast a packet from a VM that communicates with the sender.

10. The method of claim 1, wherein the first component comprises a virtual switch, further comprising:
    configuring the first component to receive, from the first VM operating at the first computing node, a request to receive multicast packets in the overlay network; and
    causing the first component to send to the data processing system a join request, wherein the join request is usable at the data processing system to add the first VM as a subscriber receiver in the multicast data structure.

11. The method of claim 1, wherein the first component comprises the virtual switch, further comprising:
    configuring the first component to receive, from the first VM operating at the first computing node, a request to stop receiving multicast packets in the overlay network; and
    causing, responsive to the first VM being a subscriber receiver, the first component to send to the data processing system a leave request, wherein the leave request is usable at the MSC a multicast service cluster data processing system (MSC) to remove the first VM as the subscriber receiver from the multicast data structure.

12. The method of claim 1, further comprising:
    configuring a second component in a second computing node to receive, from a second VM operating at the second computing node, a request to stop receiving multicast packets in the overlay network;
    configuring the second component to determine whether any local VM other than the second VM in the second computing node is configured to receive multicast packets in the overlay network; and
    causing, responsive to at least one local VM in the second computing node remaining configured to receive multicast packets, the second component to modify a status of the second VM, wherein the modified status of the second VM prevents the second component from sending to the second VM a logically multicast packet received by the second component.

13. A method for logical multicasting in overlay networks, the method comprising:
    receiving at a first time, at a first component of a first computing node in an overlay network, from a first virtual machine (VM) operating at the first computing node, a request to receive multicast packets in the overlay network, wherein a multicast data structure for the overlay network is maintained only by a data processing system, and wherein the multicast data structure contains information of each receiver that is configured to receive unicast packets during logical multicasting in the overlay network;
sending a join request to the data processing system, wherein the join request is usable at the data processing system to add the first VM as a subscriber receiver in a multicast data structure;
receiving, at the first component, from the first VM, a packet;
unicasting from the first component to the data processing system, an original unicast packet corresponding to the packet;
determining at the first component, whether any local VM other than the first VM at the first computing node is configured to receive multicast packets in the overlay network; and
forwarding, responsive to at least one local VM other than the first VM at the first computing node being configured to receive multicast packets in the overlay network, the packet to the at least one local VM.

14. The method of claim 13, further comprising:
receiving, from a second VM operating at the first computing node, a request to stop receiving multicast packets in the overlay network; and
modifying at the first component, responsive to determining that the first VM remains configured to receive multicast packets in the overlay network, a status of the second VM, wherein the modified status of the second VM prevents the first component from sending to the second VM a logically multicast packet received by the first component.

15. The method of claim 13, further comprising:
receiving at a second time, from the first VM, a request to stop receiving multicast packets in the overlay network; and
sending a leave request to the data processing system, wherein the leave request is usable at the data processing system to remove the first VM as the subscriber receiver from the multicast data structure.

16. The method of claim 13, further comprising:
receiving, at the first component, a notification from the data processing system, the notification informing the first component that no subscriber receivers remain in the multicast data structure;
receiving, at the first component, from a second VM a request to multicast a packet in the overlay network; and
blocking, at the first component, responsive to receiving the notification, the request to multicast the packet.

17. The method of claim 13, wherein the method is embodied in a computer program product comprising one or more computer-readable storage mediums and computer-readable program instructions which are stored on the one or more computer-readable storage mediums and executed by one or more processors.

18. The method of claim 13, wherein the method is embodied in a computer system comprising one or more processors, one or more computer-readable memories, one or more computer-readable storage mediums and program instructions which are stored on the one or more computer-readable storage mediums for execution by the one or more processors via the one or more memories and executed by the one or more processors.

19. A computer program product for logical multicasting in overlay networks, the computer program product comprising one or more computer-readable storage media and program instructions stored on at least one of the one or more storage media, the stored program instructions comprising:
program instructions to receive, at a data processing system, an original unicast packet from a first component in a first computing node in an overlay network, wherein the first component comprises a virtual switch, wherein the received original unicast packet was unicast by the first computing node only to the data processing system, and wherein a multicast data structure for the overlay network is maintained only by the data processing system, the multicast data structure containing information of each receiver that is configured to receive unicast packets during logical multicasting in the overlay network;
program instructions to select, from a set of subscriber receivers in the multicast data structure, a subset of the subscriber receivers;
program instructions to unicast a copy of the received original unicast packet to each subscriber receiver in the subset;
program instructions to configure the first component, to determine whether any local virtual machine (VM) other than a first VM at the first computing node is configured to receive multicast packets in the overlay network, wherein the first VM sends a packet to the first component causing the original unicast packet to be unicast to the data processing system; and
program instructions to forward, responsive to at least one local VM other than the first VM at the first computing node being configured to receive multicast packets in the overlay network, the packet to the at least one local VM.

20. The computer program product of claim 19, wherein the stored program instructions further comprise:
program instructions to evaluate a policy to determine whether the first component is associated with a subscriber receiver in the multicast data structure; and
program instructions to add, responsive to the evaluating being negative, the first component as a subscriber receiver in the multicast data structure.

21. The computer program product of claim 19, wherein the stored program instructions further comprise:
program instructions to evaluate a policy to determine whether the first component is allowed to multicast in the overlay network, wherein the selecting is responsive to the evaluating being affirmative.

22. A computer program product for logical multicasting in overlay networks, the computer program product comprising one or more computer-readable storage media and program instructions stored on at least one of the one or more storage media, the stored program instructions comprising:
program instructions to receive at a first time, at a first application executing using a processor and a memory in a first component of a first computing node in an overlay network, from a first virtual machine (VM) operating at the first computing node, a request to receive multicast packets in the overlay network, wherein to cause multicasting in the overlay network the first computing node only unicasts to a multicast service cluster data processing system (MSC) and only the MSC maintains a multicast data structure that contains information of each receiver that its configured to receive unicast packets during logical multicasting in the overlay network;

program instructions to send to the MSC a join request, wherein the join request is usable at the MSC to add the first VM as a subscriber receiver in a multicast data structure;

receiving, at the first component, from a first VM, a packet;

unicasting from the first component to the data processing system, an original unicast packet corresponding to the packet;

determining at the first component, whether any local VM other than the first VM at the first computing node is configured to receive multicast packets in the overlay network; and forwarding, responsive to at least one local VM other than the first VM at the first computing node being configured to receive multicast packets in the overlay network, the packet to the at least one local VM.

23. A computer system for logical multicasting in overlay networks, the computer system comprising one or more processors, one or more computer-readable memories, and one or more computer-readable storage media, and program instructions stored on at least one of the one or more storage media for execution by at least one of the one or more processors via at least one of the one or more memories, the stored program instructions comprising:

program instructions to receive, at a data processing system, an original unicast packet from a first component in a first computing node in an overlay network, wherein the first component comprises a virtual switch, wherein the received original unicast packet was unicast by the first computing node only to the data processing system, and wherein a multicast data structure for the overlay network is maintained only by the data processing system, the multicast data structure containing information of each receiver that is configured to receive unicast packets during logical multicasting in the overlay network;

program instructions to select, from a set of subscriber receivers in the multicast data structure, a subset of the subscriber receivers;

program instructions to unicast a copy of the received original unicast packet to each subscriber receiver in the subset;

program instructions to configure the first component, to determine whether any local virtual machine (VM) other than a first VM at the first computing node is configured to receive multicast packets in the overlay network, wherein the first VM sends a packet to the first component causing the original unicast packet to be unicast to the data processing system; and program instructions to forward, responsive to at least one local VM other than the first VM at the first computing node being configured to receive multicast packets in the overlay network, the packet to the at least one local VM.

* * * * *